Sept. 23, 1952  A. L. HENRY ET AL  2,611,417
MECHANIC'S CREEPER

Filed Dec. 21, 1946  2 SHEETS—SHEET 1

ARTHUR L. HENRY
ALBERT E. KILLINGSWORTH
INVENTORS

BY Herbert J. Brown
ATTORNEY

Sept. 23, 1952  A. L. HENRY ET AL  2,611,417
MECHANIC'S CREEPER

Filed Dec. 21, 1946  2 SHEETS—SHEET 2

ARTHUR L. HENRY
ALBERT E. KILLINGSWORTH
INVENTORS

BY *Herbert J. Brown*
ATTORNEY

Patented Sept. 23, 1952

2,611,417

UNITED STATES PATENT OFFICE 2,611,417

MECHANIC'S CREEPER

Arthur L. Henry and Albert E. Killingsworth, Fort Worth, Tex.; said Killingsworth assignor to said Henry Application December 21, 1946, Serial No. 717,708

4 Claims. (Cl. 155—41)

This invention relates to mechanic's tools, and has reference to a creeper of the type used for supporting mechanics when working on automobiles and other vehicles.

An object of the invention is to provide, in a creeper of the referred to class, a device which is versatile and capable of many uses.

Another object of the invention is to provide a foldable creeper which, in its folded position, may be conveniently stored when not in use.

A further object of the invention is to provide an extensible construction which is not only sturdy, but one which readily lends itself to mass production fabrication methods.

These and other objects of the invention will become apparent from the following description of the accompanying drawings, wherein.

Figure 1:
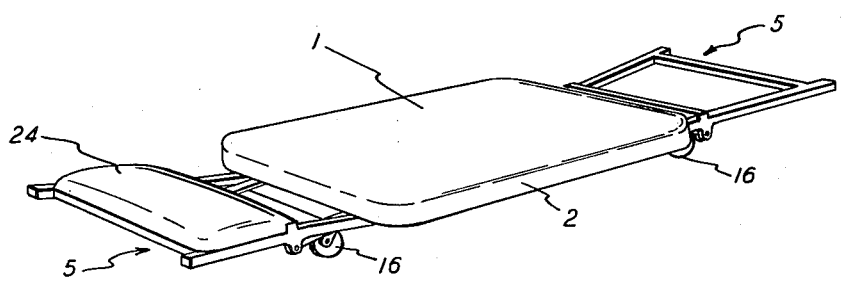
Figure 1 is a perspective view of a creeper embodying the features of the present invention and showing the same in its extended position, as when used for supporting a mechanic beneath an automobile.

The illustrated exemplary form of the invention includes a rectangular bed 1 having a downwardly disposed flange 2 therearound. The bottom surface of the bed 1 is provided with spaced parallel stiffeners 3 which are secured to the said bed by suitable means, such as spot welding, riveting, or the like.

Pairs of downwardly projecting ears 4 are provided at the ends of the stiffeners 3 and pivotally receive the ends of leg units 5, each of the said units being comprised of a pair of legs 6 and spaced cross members 7 integrally joined at the upper and lower ends thereof. As particularly shown in Figure 11, each upper cross member 7 is offset with respect to the length of the legs 6 to accommodate certain parts to be described when the device is in its folded position.

Figures 8, 9:
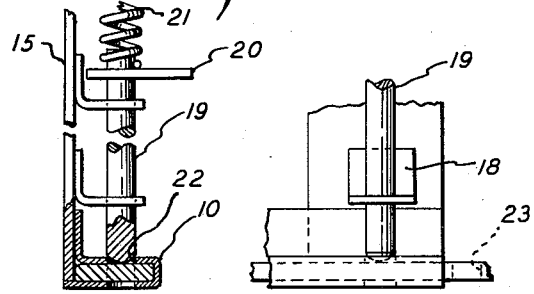
Figure 8 is a broken elevational end view illustrating one of the latch mechanisms forming a part of the invention.
Figure 9 is a view similar to Figure 8, but taken at a right angle with respect thereto.

Intermediate the ends of the legs 6 there are projecting ears 8 having pins 9 therethrough for pivotally receiving hinged sleeves 10 which are substantially rectangular in cross section, as particularly shown in Figure 8.

Other ears 11 project downwardly from the bed stiffeners 3 and have pins 12 therethrough to pivotally support pairs of hinged braces 13 which are slidably received in the sleeves 10.

Figure 7:
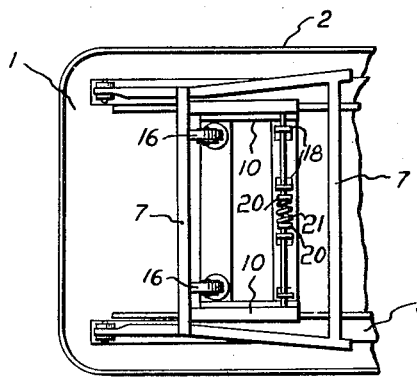
Figure 7 is a view similar to Figure 6 but showing the leg unit in its folded position.
Figures 10, 11:
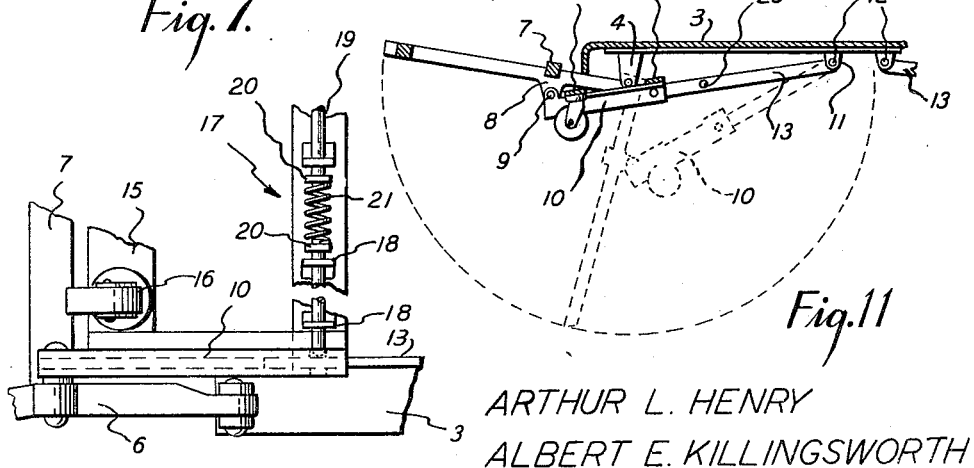
Figure 10 is a broken bottom view illustrating the relation between one of the leg units and its accompanying latch mechanism.
Figure 11 is a broken longitudinal sectional view of one end of the creeper and showing, by means of dotted lines, the movement of one of the leg units and its accompanying parts.

The pairs of sleeves 10 are provided with lateral cross-members 14 and 15 near the ends of said sleeves as shown in Figure 11. The last referred to outer cross members 15 have casters 16 secured thereon, as particularly shown in Figures 7, 10 and 11, whereas the inner cross members 14 support latch assemblies 17.

Each latch assembly 17 is comprised of spaced projecting ears 18 secured on the cross member 14 and slidably receives opposing latch rods 19, both of which are in axial alignment. The inner ends of the pairs of rods 19 are provided with finger tabs 20 and engage a compression spring 21 therebetween. Each sleeve 10 is provided with an opening 22 in its side to permit the outer ends of the rods 19 to pass therethrough and engage spaced apertures 23 in the hinged braces 13.

One of the leg units 5 is provided with a head rest 24 which extends between and is supported by the pairs of legs 6, and is additionally supported by the adjacent cross members 7.

By reason of the described construction and arrangement each leg unit 5 may be pivoted, as shown in Figure 11, from a position within and beneath the bed 1 to an outward and slightly upward position. By clasping a pair of finger tabs 20 between the thumb and forefinger, the rods 19 may be retracted, thus releasing them from the apertures 23 in the hinged braces 13. The corresponding leg unit 5 may then be pivoted to the desired position, such as shown in any of the Figures 1 through 5. Upon releasing the finger tabs 20 the rods 19 are moved outwardly by the springs 21 to engage certain of the apertures 23 in the hinged braces 13 to maintain the leg unit 5 in the desired position.

As shown in Figure 1, the device may be extended at both ends to support the body of a mechanic on the bed 1 and his head on the head rest 24. The other leg unit 5 when thus disposed provides means for supporting the mechanic's legs.

Figure 2:
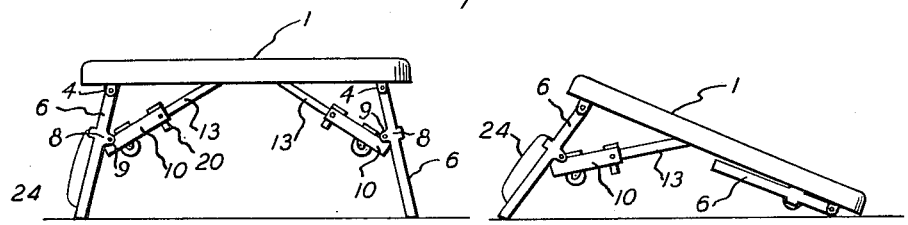
Figure 2 is a side elevational view of the creeper illustrated in Figure 1, but showing the same positioned for use as a platform or stool.
Figure 3:
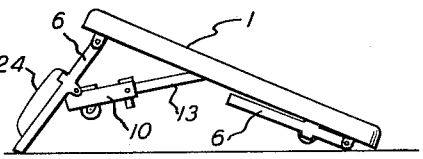
Figure 3 is another side elevational view of the creeper, similar to Figure 2, but showing the same positioned for use as an inclined back rest.
Figure 4:
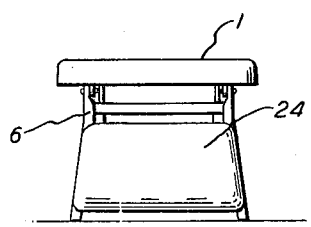
Figure 4 is an end elevational view of Figure 2.

Similarly, the leg units 5 may be adjusted downwardly, as shown in Figure 2, to provide a stool or platform for the mechanic to sit on or stand on.

Similarly, by folding one of the leg units 5 inwardly and having the other leg unit 5 downwardly disposed, a convenient back rest is provided.

Figure 5:
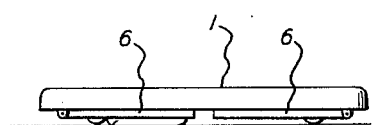
Figure 5 is a side elevational view of the creeper in its folded position.
Figure 6:
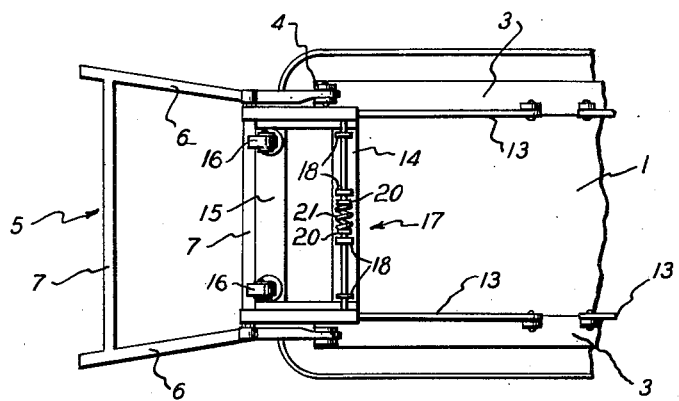
Figure 6 is a broken bottom view of the creeper and showing one of the leg units in its extended position.

As shown in Figure 5 the device, when folded, is made relatively small and may, when in this position, be readily and conveniently stored.

What is claimed is:

1. A mechanic's creeper comprising a flat bed, a pair of legs hingedly secured on the bottom of and spaced from the ends of said bed, braces hingedly mounted on the bottom of said bed and near the transverse center thereof, sleeves pivotally secured to said legs and adapted to slidably receive said braces, cross-members secured to pairs of said sleeves near the pivoted ends thereof, and wheels mounted on said cross-members and positioned to extend downwardly therefrom.

2. A mechanic's creeper comprising a flat bed, pairs of legs hingedly secured on the bottom of and near the ends of said bed, stop means positioned to prevent said legs from being hingedly extended more than substantially level with the upper surfaces of said bed, braces hingedly mounted on the bottom of said bed and near the transverse center thereof, sleeves pivotally secured to said legs and adapted to slidably receive said braces, cross-members secured to pairs of said sleeves near the pivoted ends thereof, and wheels mounted on said cross members and positioned to extend downwardly therefrom.

3. A mechanic's creeper comprising a flat bed, pairs of legs hinged on the bottom thereof and spaced from the ends of said bed, pairs of braces hingedly mounted on the bottom of said bed and near the transverse center thereof, sleeves pivotally secured to said legs and adapted to slidably receive said braces, cross-members secured to pairs of said sleeves near the pivoted ends thereof, wheels mounted on said cross-members and positioned to extend downwardly therefrom, and latch means carried by said pairs of sleeves arranged to engage said braces received therein.

4. A mechanic's creeper comprising a flat bed, pairs of legs hinged on the bottom thereof and spaced from the ends of said bed, pairs of braces hingedly mounted on the bottom of said bed near the transverse center thereof, sleeves pivotally secured to said legs and adapted to slidably receive said braces, cross-members secured to pairs of said sleeves near the pivoted ends thereof, wheels mounted on said cross-members and positioned to extend downwardly therefrom, and means latching said sleeves with said braces at different locations along the length of the latter.

ARTHUR L. HENRY.
ALBERT E. KILLINGSWORTH.

REFERENCES CITED

The following references are of record in the file of this patent:

UNITED STATES PATENTS

| Number | Name | Date |
|---|---|---|
| 110,697 | Turner | Jan. 3, 1871 |
| 485,502 | La Purl | Nov. 1, 1892 |
| 1,033,324 | Judge et al. | July 23, 1912 |